US012567349B2

(12) United States Patent
Wang

(10) Patent No.: US 12,567,349 B2
(45) Date of Patent: Mar. 3, 2026

(54) DISPLAY PANEL AND DISPLAY APPARATUS

(71) Applicant: WUHAN TIANMA MICROELECTRONICS CO., LTD., Wuhan (CN)

(72) Inventor: Meihong Wang, Wuhan (CN)

(73) Assignee: WUHAN TIANMA MICROELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 17/756,374

(22) PCT Filed: Jul. 26, 2021

(86) PCT No.: PCT/CN2021/108425
§ 371 (c)(1),
(2) Date: May 24, 2022

(87) PCT Pub. No.: WO2023/272838
PCT Pub. Date: Jan. 5, 2023

(65) Prior Publication Data

US 2024/0203311 A1 Jun. 20, 2024

(30) Foreign Application Priority Data

Jun. 30, 2021 (CN) ........................ 202110741567.4

(51) Int. Cl.
*G09G 3/20* (2006.01)

(52) U.S. Cl.
CPC ....... *G09G 3/20* (2013.01); *G09G 2320/0233* (2013.01)

(58) Field of Classification Search
None
See application file for complete search history.

(56) References Cited

U.S. PATENT DOCUMENTS

| | | | | |
|---|---|---|---|---|
| 2020/0342799 | A1* | 10/2020 | Yang | ................. H01L 27/14812 |
| 2020/0410921 | A1 | 12/2020 | Kim et al. | |
| 2021/0193782 | A1 | 6/2021 | Seo et al. | |
| 2021/0408111 | A1* | 12/2021 | Lou | ........................... G09F 9/33 |

(Continued)

FOREIGN PATENT DOCUMENTS

| | | | |
|---|---|---|---|
| CN | 110265455 | A | 9/2019 |
| CN | 110854178 | A | 2/2020 |
| CN | 111211150 | A | 5/2020 |

(Continued)

*Primary Examiner* — Andre L Matthews
(74) *Attorney, Agent, or Firm* — KILPATRICK TOWNSEND & STOCKTON LLP

(57) ABSTRACT

A display panel and a display apparatus are provided. The display panel has first to fourth display regions, and includes first to fourth pixel circuits, first to fourth light-emitting elements, and first data lines. Each row of the fourth pixel circuits includes at least one first arrangement unit arranged along a first direction. Each first arrangement unit includes N fourth pixel circuits and a first interval space, where N is a positive integer. The N fourth pixel circuits are sequentially arranged adjacent to each other along the first direction, and the first interval space is located at a side of the N fourth pixel circuits along the first direction. At least one first data line passes through the first interval space.

20 Claims, 12 Drawing Sheets

(56) References Cited

U.S. PATENT DOCUMENTS

2022/0310709 A1* 9/2022 Zhang .................. H10K 59/122

FOREIGN PATENT DOCUMENTS

| | | | |
|---|---|---|---|
| CN | 111326560 | A | 6/2020 |
| CN | 111402743 | A | 7/2020 |
| CN | 111446282 | A | 7/2020 |
| CN | 111916486 | A | 11/2020 |
| CN | 112271203 | A | 1/2021 |
| CN | 112562586 | A | 3/2021 |
| CN | 112992991 | A | 6/2021 |
| IN | 111785761 | A | 10/2020 |
| JP | 2010230797 | A | 10/2010 |

* cited by examiner

DISPLAY PANEL AND DISPLAY APPARATUS

This application is a national stage of International Application No. PCT/CN2021/108425, filed on Jul. 26, 2021, which claims priority to Chinese Patent Application No. 202110741567.4, filed on Jun. 30, 2021. Both of the aforementioned applications are hereby incorporated by reference in their entireties.

FIELD

The present disclosure relates to the field of display technologies, and, particularly, relates to a display panel and a display apparatus.

BACKGROUND

In an electronic device including a display panel, the pursuit of a high screen-to-body ratio with better visual experience has become one of trends in the development of current display technologies.

Taking mobile phones and tablet computers as examples, in a current full-screen solution, at least part of a display region of the display panel is reused as a photosensitive element integration region. In this case, photosensitive elements such as a front camera and an infrared sensing element can be provided at the back of the photosensitive element integration region of the display panel, and the light can pass through the photosensitive element integration region to reach the photosensitive element to realize corresponding functions such as front camera shooting and infrared sensing.

In the above solutions, the brightness of the photosensitive element integration region is usually lower than the brightness of other display regions, resulting in non-uniformity of the display brightness.

SUMMARY

In one embodiment of the present disclosure, a display panel is provided. The display panel has a first display region, a second display region, a third display region, and at least one fourth display region. The third display region is located at least one side of the first display region in a first direction. The second display region at least partially surrounds the first display region and the third display region. The first display region is reused as a photosensitive element integration region. The at least one fourth display region is located between the third display region and the second display region in a second direction intersecting with the first direction and is located between the first display region and the second display region in the second direction. The display panel includes first pixel circuits, first light-emitting elements, second pixel circuits, second light-emitting elements, third pixel circuits, third light-emitting elements, fourth pixel circuits, fourth light-emitting elements, and first data lines. The first pixel circuits are electrically connected to the first light-emitting elements, the first light-emitting elements are located in the first display region, and the first pixel circuits are located in the third display region. The second pixel circuits are electrically connected to the second light-emitting elements, and the second pixel circuits and the second light-emitting elements are located in the second display region. The third pixel circuits are electrically connected to the third light-emitting elements, and the third pixel circuits and the third light-emitting elements are located in the third display region. The fourth pixel circuits are electrically connected to the fourth light-emitting elements. The fourth pixel circuits and the fourth light-emitting elements are located in the at least one fourth display region. The fourth pixel circuits are arranged in at least one row in the at least one fourth display region. Each of the at least one row of the fourth pixel circuits includes at least one first arrangement unit arranged along the first direction, and each of the at least one first arrangement unit includes N fourth pixel circuits of the fourth pixel circuits and a first interval space, where N is a positive integer. The N fourth pixel circuits are sequentially arranged adjacent to each other along the first direction, and the first interval space is located at a side of the N fourth pixel circuits along the first direction. Each of the first data lines is electrically connected to at least one of the first pixel circuits and at least one of the second pixel circuits, and at least one of the first data lines passes through the first interval space.

In another embodiment of the present disclosure, a display apparatus is provided. The display apparatus includes the display panel provided in any one of the above embodiments.

BRIEF DESCRIPTION OF DRAWINGS

Other features, objects and advantages of the present disclosure will become more apparent by reading the following detailed description of non-limiting embodiments with reference to the accompanying drawings, the same or similar reference signs denote the same or similar features, and the drawings are not drawn in an actual scale.

DESCRIPTION OF EMBODIMENTS

The features and exemplary embodiments of the present disclosure will be described in detail below. In order to more clearly illustrate objectives, solutions, and advantages of the embodiments of the present disclosure, the solutions in the embodiments of the present disclosure are clearly and completely described in details with reference to the accompanying drawings. It is appreciated that, the embodiments are to explain the present disclosure, and are not configured to limit the present disclosure. The present disclosure may be practiced without some of these details. The following description of the embodiments is only intended to provide a better understanding of the present disclosure by illustrating examples of the present disclosure.

It should be noted that, in this context, relational terms such as "first" and "second" are only used to distinguish one entity or operation from another entity or operation, and do not necessarily require or imply any actual relationship or sequence between these entities or operations.

It should be understood that, in describing a structure of a component, when a layer or region is referred to as being "on" or "over" another layer or region, it can be directly on the other layer or region, or another layer or region are also included therebetween. In one embodiment, if the component is turned over, the layer or region will be "below" or "beneath" another layer or region.

Figure 1:
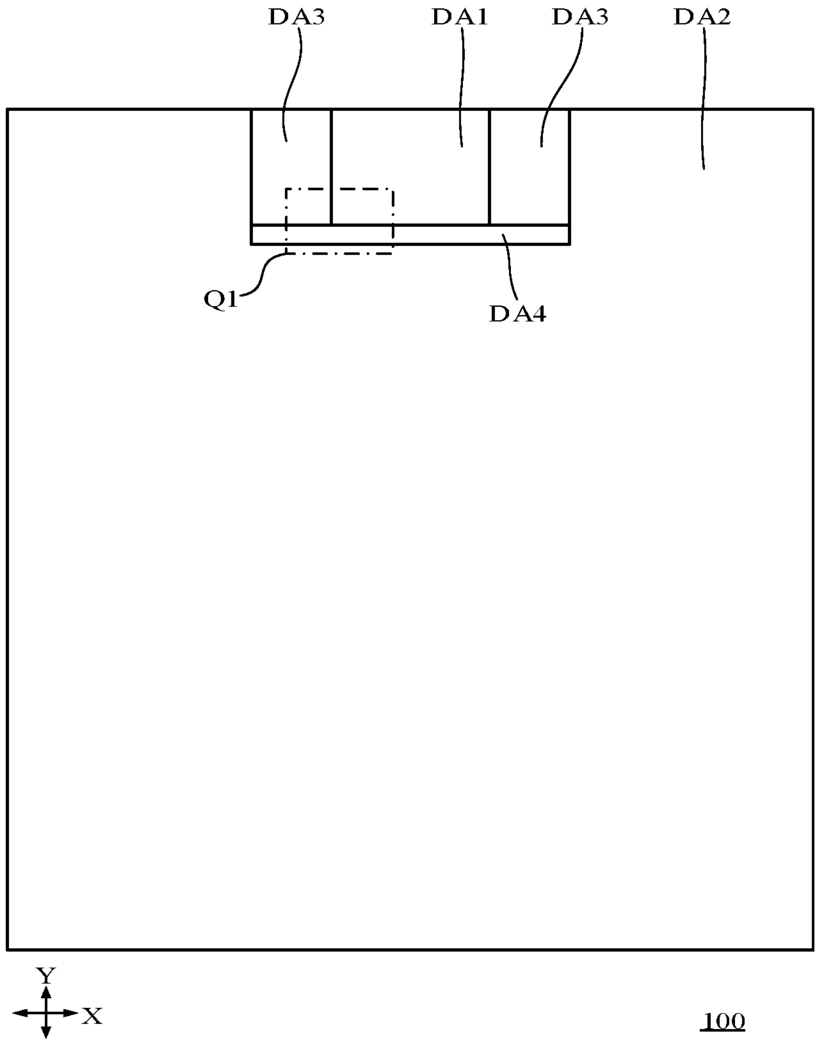
FIG. 1 is a top view of a display panel according to an embodiment of the present disclosure.
Figure 2:
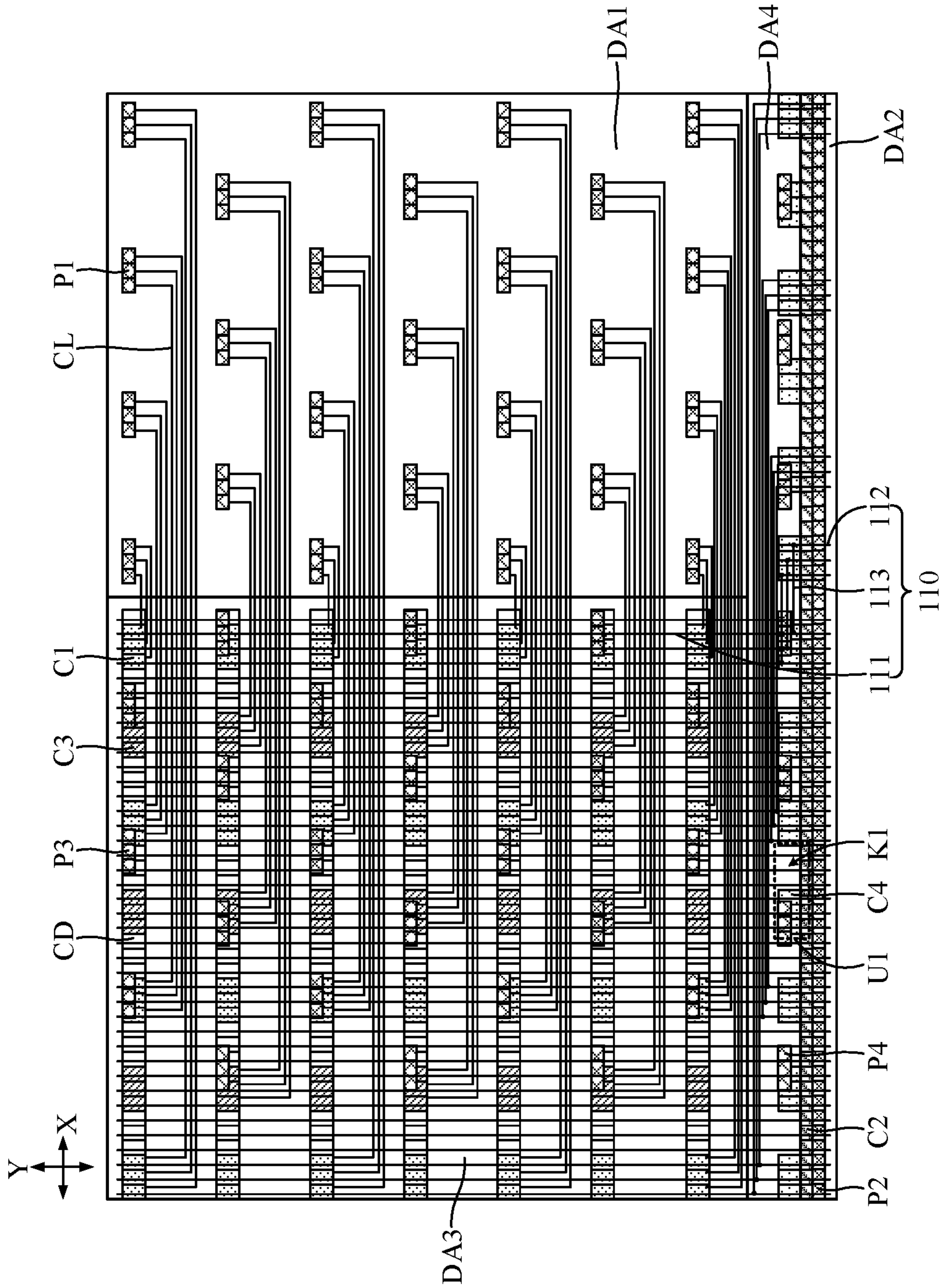
FIG. 2 is a partially enlarged schematic diagram of a display panel according to an embodiment of the present disclosure.

The present disclosure provides a display panel. FIG. 1 is a top view of a display panel according to an embodiment of the present disclosure, and FIG. 2 is a partial enlarged schematic diagram of a display panel according to an embodiment of the present disclosure. Exemplarily, FIG. 2 is a partial enlargement schematic illustration of a Q1 region shown in FIG. 1.

The display panel 100 includes a first display region DA1, a second display region DA2, a third display region DA3, and a fourth display region DA4. The third display region DA3 is located at least one side of the first display region DA1 along a first direction X. The second display region DA2 at least partially surrounds the first display region DA1 and the third display region DA3. The first display region DA1 is reused to be a photosensitive element integration region. The fourth display region DA4 is located between the third display region DA3 and the second display region DA2, and between the first display region DA1 and the second display region DA2 along a second direction Y which intersects with a first direction X. In some embodiments, the display panel 100 further includes a non-display region (not shown). The non-display region surrounds the first display region DA1, the second display region DA2, the third display region DA3, and the fourth display region DA4.

The display panel 100 further includes a first pixel circuit C1 and a first light-emitting element P1 that are electrically connected to each other, a second pixel circuit C2 and a second light-emitting element P2 that are electrically connected to each other, a third pixel circuit C3 and a third light-emitting element P3 that are electrically connected to each other, a fourth pixel circuit C4 and a fourth light emitting element P4 that are electrically connected to each other.

The first light-emitting element P1 is located in the first display region DA1, and the first pixel circuit C1 is located in the third display region DA3. In some embodiments, each first pixel circuit C1 is electrically connected to at least one first light-emitting element P1 through corresponding connection lines CL. The second pixel circuit C2 and the second light emitting element P2 that are electrically connected to each other are located in the second display region DA2. The third pixel circuit C3 and the third light emitting element P3 that are electrically connected to each other are located in the third display region DA3. The fourth pixel circuit C4 and the fourth light-emitting element P4 that are electrically connected to each other are located in the fourth display region DA4. In some embodiments, in addition to the first pixel circuit C1 and the third pixel circuit C3, a virtual pixel circuit CD may also be arranged in the third display region DA3. The virtual pixel circuit CD can balance density of etching patterns of different display regions, improving etching uniformity or display uniformity. In some embodiments, the virtual pixel circuit CD may not be provided in the third display region DA3. It can be understood that in order to ensure that the first display region DA1 can display an image normally, the light-emitting elements of the first display region DA1 meet a number, and the number of connecting line CL is large, and the connecting lines CL may be set densely at adjacent positions between the first display region DA1 and the third display region DA3.

The fourth pixel circuits C4 are arranged in at least one row in the fourth display region DA4. Each row of the fourth pixel circuits C4 includes at least one first arrangement unit U1 arranged along the first direction X. Each first arrangement unit U1 includes N fourth pixel circuits C4 and a first interval space K1, where N is a positive integer. The N fourth pixel circuits C4 are successively arranged adjacent to each other along the first direction X, and the first interval space K1 is located at a side of the N fourth pixel circuits C4 along the first direction X.

The display panel 100 further includes multiple first data lines 110. Each first data line 110 is electrically connected to at least one first pixel circuit C1 and at least one second pixel circuit C2. At least one first data line 110 passes through the first interval space K1, so that orthographic projections of multiple first data lines 110 on the display surface do not overlap with orthographic projections of the connecting lines CL on the display surface.

According to the display panel 100 of the embodiments of the present disclosure, the fourth pixel circuits C4 are arranged in at least one row in the fourth display region DA4, and each row of the fourth pixel circuits C4 includes first arrangement units U1. Each first arrangement unit U1 includes the first interval space K1, that is, at least one pixel circuit in the fourth display region DA4 that is not connected to the light-emitting element is removed to obtain the first interval space K1. The first interval space K1 can be used as a winding space for the first data lines 110, and at least one first data line 110 passes through the first interval space K1, thereby reducing or even preventing the first data lines 110 from passing through the first display region DA1. Therefore, overlapping between the orthographic projection of the first data line 110 on the display surface and the orthographic projection of the wire (e.g., the connection line CL) connected to the first display region on the display surface is reduced, and it is avoided that densely arranged wires that overlap with the first data lines 110 affect the loads of the first data lines 110, thereby avoiding affecting the data signals. In this case, a load difference between the part of the first data line 110 in the third display region DA3 and the part of the first data line 110 in the second display region DA2 is greatly reduced, and a load difference between the data lines in different display regions can also be reduced. The influence of the wire, such as the connection line CL, on the coupling crosstalk of the first data line 110 is reduced, so that the brightness of the first light emitting element P1 tend to be the same as that of the second light emitting element P2, thereby improving the uniformity of the display brightness of the display panel 100. In general, in order to match the brightness of light-emitting elements in different regions, the driving current corresponding to the light-emitting element with lower brightness can be increased, however, increasing the driving current can shorten the service life of the light-emitting element, which can affect the service life of the entire display panel and display effect. In this case, by changing the structural design of the display panel, the load difference between the part of the first data line 110 in the third display region DA3 and the part of the first data line 110 in the second display region DA2 can be reduced, and the brightness difference between the first light-emitting element P1 and the second light-emitting element P2 can be reduced, thereby improving the uniformity of display brightness of the display panel 100, while improving the service life of the first light-emitting element P1, and further increasing the service life of the display panel 100.

In some embodiments, the fourth pixel circuits C4 are arranged in one row in the fourth display region DA4. In other embodiments, the fourth pixel circuits C4 can be arranged in two rows, three rows, or other number of rows in the fourth display region DA4.

Each row of the fourth pixel circuits C4 includes at least one first arrangement unit U1. Each first arrangement unit U1 includes a first interval space K1. In some embodiments, the number of first arrangement units U1 in each row of the fourth pixel circuits C4 is two or more, so that there are two or more first interval spaces K1.

Figure 3:
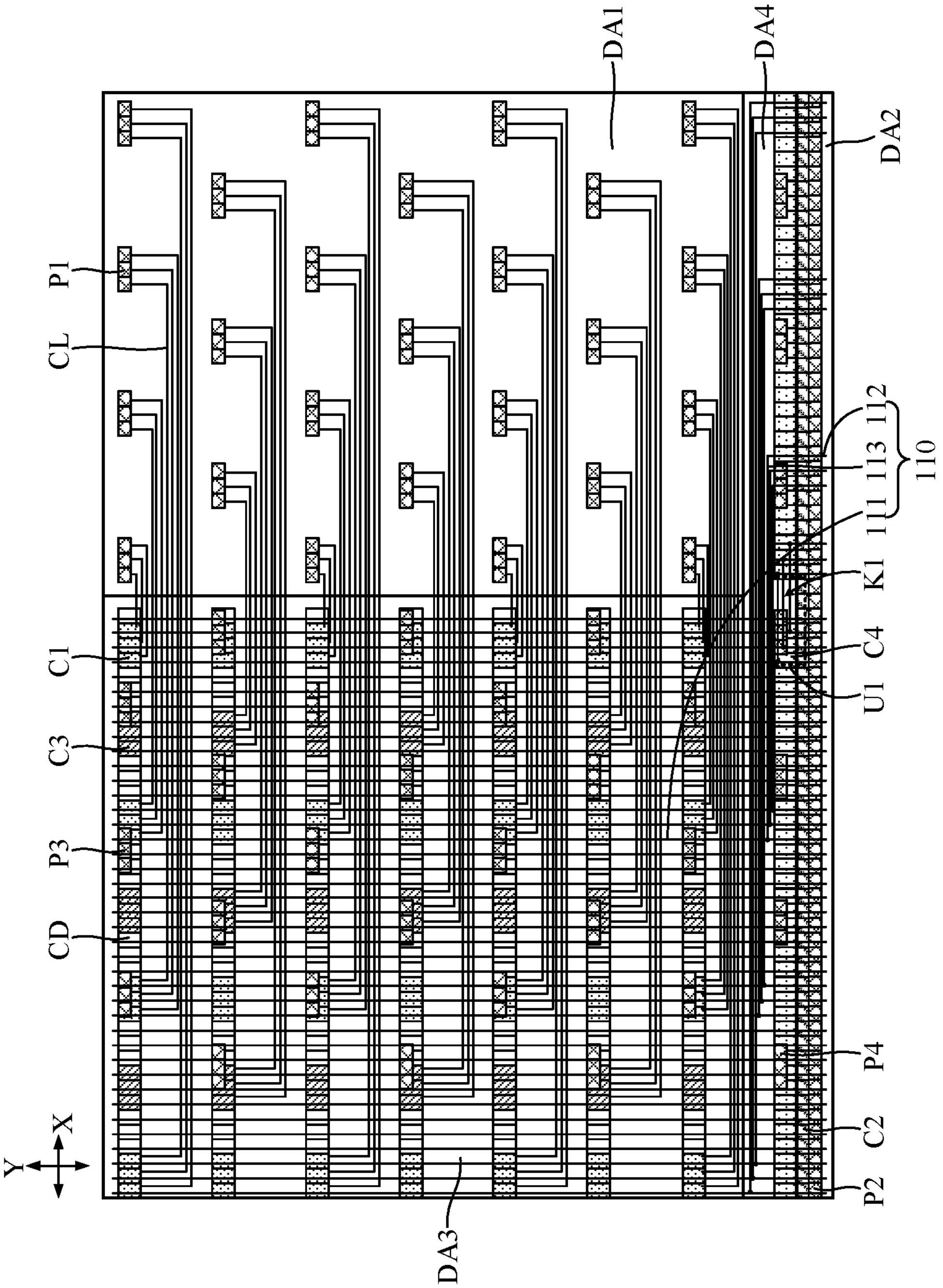
FIG. 3 is a partial enlarged schematic diagram of a display panel according to another embodiment of the present disclosure.

FIG. 3 is a partial enlarged schematic diagram of a display panel according to another embodiment of the present disclosure. Exemplarily, FIG. 3 is a partial enlarged schematic diagram of the region Q1 in FIG. 1. In some embodiments, each row of the fourth pixel circuits C4 includes one first arrangement unit U1, so that the number of the first interval spaces K1 in each row of the fourth pixel circuits C4 is also one. In some embodiments, the number of the first interval space K1 in each row of the fourth pixel circuits C4 can be two, three, or any other number.

In some embodiments, at least one of the fourth pixel circuits C4 in each row of the fourth pixel circuits C4 can be replaced with a virtual pixel circuit that is configured to not emit light by the light-emitting element.

As shown in FIG. 2 or FIG. 3, in some embodiments, each first pixel circuit C1 is electrically connected to at least one first light-emitting element P1 through a corresponding connection line CL. Each first data line 110 includes a first data sub-line 111, a second data sub-line 112, and a third data sub-line 113. The first data sub-line 111 extends in the third display region DA3 along the second direction Y, and is electrically connected to at least one first pixel circuit C1. The second data sub-line 112 extends in the second display region DA2 along the second direction Y, and is electrically connected to multiple second pixel circuits C2. The third data sub-line 113 passes through the fourth display region DA4, and electrically connects the first data sub-line 111 to the second data sub-line 112, in which at least one third data sub-line 113 passes through the first interval space K1. The third data sub-line 113 electrically connects the first data sub-line 111 to the second data sub-line 112, so that the first pixel circuit C1 and the second pixel circuit C2 can supply data signals through the same first data line 110. The third data sub-line 113 extending to the fourth display region DA4 passes through the first interval space K1 to avoid the overlapping between the orthographic projection of the third data sub-line 113 on the display surface and the orthographic projection of the connecting line CL on the display surface, and it is avoided that the connecting line CL affects a load of the first data line 110, thereby improving the uniformity of the display brightness of the display panel 100. Taking the factors of matching IC with the display image into account, in the first pixel circuit C1 and the second pixel circuit C2 that are electrically connected to the same first data line 110, the first light-emitting element P1 at least partially and electrically connected to the first pixel circuit C1, and the second light-emitting element P2 electrically connected to the second pixel circuit C2 are located in a same column in the second direction Y.

Figure 4:
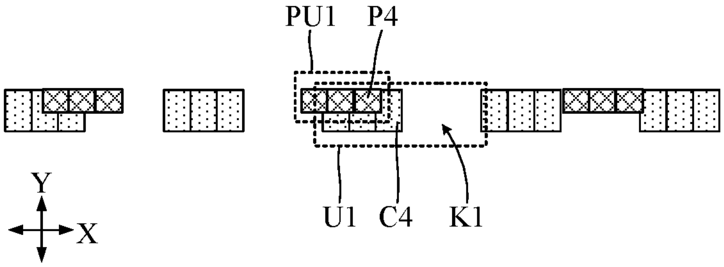
FIG. 4 is a partially enlarged schematic diagram of a fourth display region of a display panel according to an embodiment of the present disclosure.

FIG. 4 is a partially enlarged schematic diagram of a fourth display region of a display panel according to an embodiment of the present disclosure. In some embodiments, the display panel 100 includes multiple first pixel units PU1 located in the fourth display region DA4. Each first pixel unit PU1 includes M fourth light-emitting elements P4, where N is a positive integer times of M. For example, each first pixel unit PU1 includes three fourth light-emitting elements P4, which can be a red fourth light-emitting element P4, a green fourth light-emitting element P4, and a blue fourth light-emitting element P4, respectively. Each first arrangement unit U1 includes three fourth pixel circuits C4. In some other embodiments, when each first pixel unit PU1 includes three fourth light emitting elements P4, each first arrangement unit U1 can include six, nine, or other number of fourth pixel circuits C4. In the display panel 100 according to the embodiment of the present disclosure, the first interval space K1 of the first arrangement unit U1 can be obtained by removing at least a part of the pixel circuits in the fourth display region DA4 that is not connected to the light-emitting element based on the structure in which the pixel circuits are arranged without intervals therebetween. When the number N of the fourth pixel circuits C4 that are provided adjacent to each other in the first arrangement unit U1 is a positive integer times of M to form the first arrangement unit U1, the fourth pixel circuits C4 adjacent to the first pixel unit PU1 can be reserved while removing other pixel circuits, and the fourth pixel circuit C4 is closer to the physical position of the corresponding fourth light-emitting element P4, and the space occupied by the wires between the fourth pixel circuit C4 and the fourth light-emitting element P4 is reduced, and the first interval space K1 with a larger area and a regular shape.

In some embodiments, a length of the first interval space K1 along the first direction X is 0.5 times to 3 times a length of the fourth pixel circuit C4 along the first direction X. For example, in some embodiments, the length of the first interval space K1 along the first direction X is 0.5 times the length of a single fourth pixel circuit C4 along the first direction X. For example, in some embodiments, the length of the first interval space K1 along the first direction X is 3 times the length of the single fourth pixel circuit C4 along the first direction X. When the length of the first interval space K1 along the first direction X is excessively short, an effective wire accommodation space cannot be formed, so that the first data line 110 is difficult to pass through the first interval space K1. When the length of the first interval space K1 along the first direction X is excessively longer, the arrangement space of the fourth pixel circuits C4 will be squeezed, so that the number of the fourth pixel circuits C4 in the fourth display region DA4 is excessively small, which is not conducive to driving display panel with a high pixel density: The length of the first interval space K1 along the first direction X is set to be 0.5 times to 3 times the length of the single fourth pixel circuit C4 along the first direction X, so that it is possible to balance the winding space of the first data line 110 and the arranging space of the fourth pixel circuit C4, thereby reducing the load influence of other wirings on the first data line 110 while ensuring better driving performance.

Figure 5:
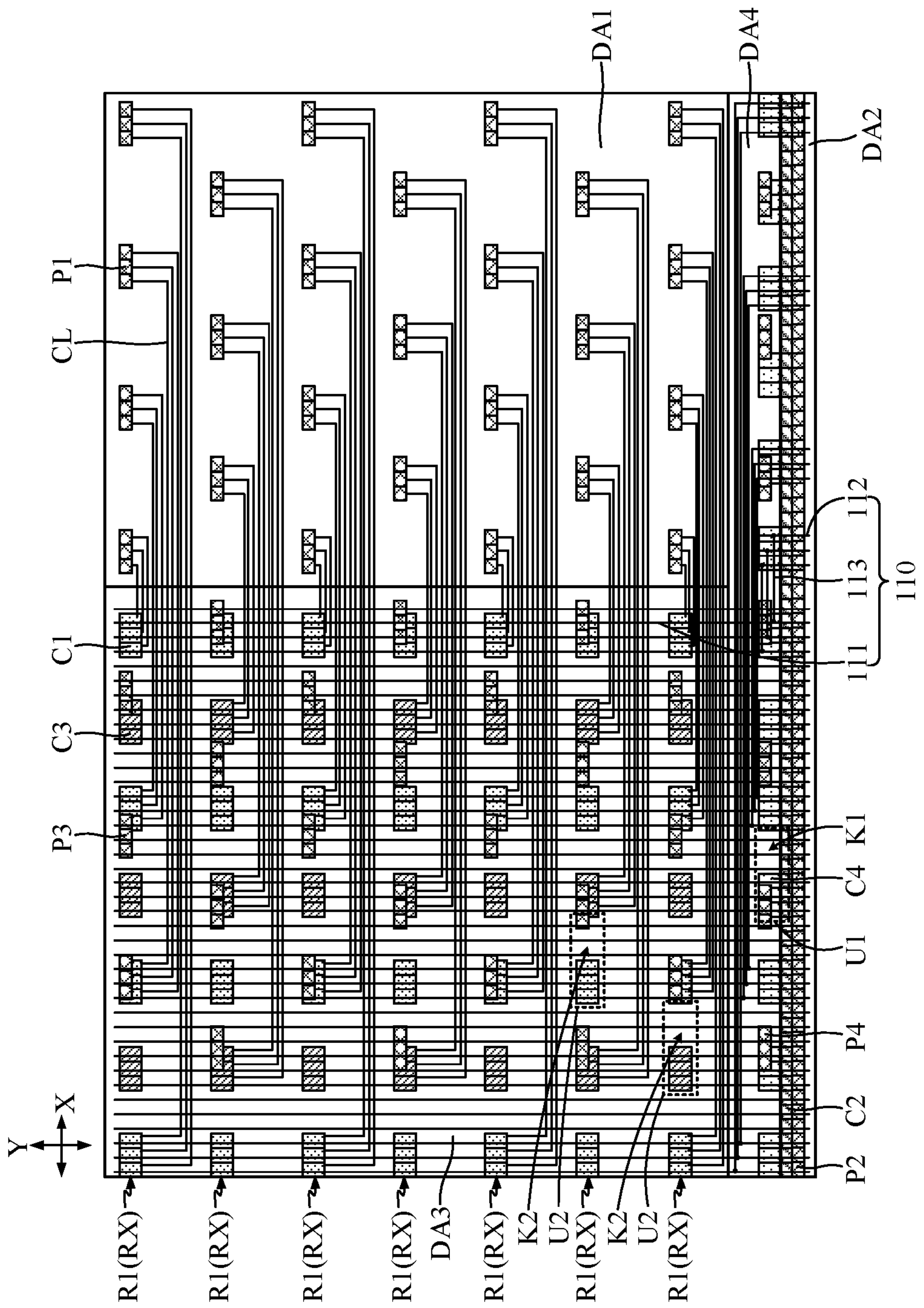
FIG. 5 is a partial enlarged schematic diagram of a display panel according to still another embodiment of the present disclosure.

FIG. 5 is a partial enlarged schematic diagram of a display panel according to another embodiment of the present disclosure. Exemplarily, FIG. 5 is a partial enlarged schematic diagram of the region Q1 in FIG. 1. In some embodiments, the third display region DA3 is provided with multiple row units RX. In each row unit RX, the first pixel circuit C1 and/or the third pixel circuit C3 and/or the virtual pixel circuit are arranged in sequence along the first direction X according to preset rules. Multiple row units RX are arranged along the second direction Y.

Multiple row units RX include at least one first row unit R1 adjacent to the fourth display region DA4. Each first row unit R1 includes multiple second arrangement units U2 arranged along the first direction X. Each second arrangement unit U2 includes P first preset pixel circuits and a second interval space K2, where P is a positive integer. The first preset pixel circuit includes at least one of a first pixel circuit C1, a third pixel circuit C3, or a first virtual pixel circuit. P first preset pixel circuits are adjacent to each other along the first direction X, and the second interval space K2 is located at a side of the P first preset pixel circuits along the first direction X. For example, in some embodiments, the second arrangement units U2 each include three first preset pixel circuits, which can be the first pixel circuits C1 or the third pixel circuits C3. Since the second interval space K2 is provided in the third display region DA3, the first data line 110 can also pass through the second interval space K2, which further increases the wiring space of the first data line 110, thereby reducing the overlapping area between the orthographic projection of the first data line 110 on the display surface and the orthographic projection of the connecting line CL on the display surface. Meanwhile, the first data lines 110 passes through the second interval space K, that is, at least a part of the first data sub-lines 111 in the first data lines 110 can be arranged in the second interval space K, so that a distance between the first data line 110 and the data line electrically connected to the third pixel circuit C3 located in the third display region D3 can be increased, and coupling crosstalk between adjacent data signal lines, thereby improving the display effect of the display panel.

In some embodiments, at least one second interval space K2 communicates with the first interval space K1 along the second direction Y, so that the second interval space K2 and the first interval space K1 are connected to each other to form a strip wiring space, which is convenient for the wiring of the first data lines 110 in the second interval space K2 and the first interval space K1.

In some embodiments, the length of the second interval space K2 along the first direction X is 0.5 times to 3 times the length of the first pixel circuit C1 along the first direction X. For example, in some embodiments, the length of the second interval space K2 along the first direction X is 0.5 times the length of the single first pixel circuit C1 along the first direction X. For example, in another embodiment, the length of the second interval space K2 along the first direction X is three times the length of the single first pixel circuit C1 along the first direction X. When the length of the second interval space K2 along the first direction X is excessively short, an effective wiring accommodation space cannot be formed, so that the first data line 110 is difficult to pass through the second interval space K2. When the length of the second interval space K2 along the first direction X is excessively longer, the arrangement space of the first pixel circuit C1 and the third pixel circuit C3 will be squeezed, and the pixel densities of the first display region DA1 and the third display region DA3 will be reduced, which is not conducive to driving display panel with a high pixel density. The length of the second interval space K2 along the first direction X is set to be 0.5 times to 3 times the length of the single first pixel circuit C1 along the first direction X, so that it is possible to balance the winding space of the first data line 110 and the arranging space of the first pixel circuit C1 and the third pixel circuit C3, thereby reducing the load influence of other wirings on the first data line 110 while ensuring better driving performance. In addition, when the length of the second interval space K2 along the first direction X is equal to the length of the first interval space K1 along the first direction X, and the second interval space K2 communicates with the first interval space K1, it is convenient to form regular wiring space to accommodate more winding structures of the first data lines 110.

Figure 6:
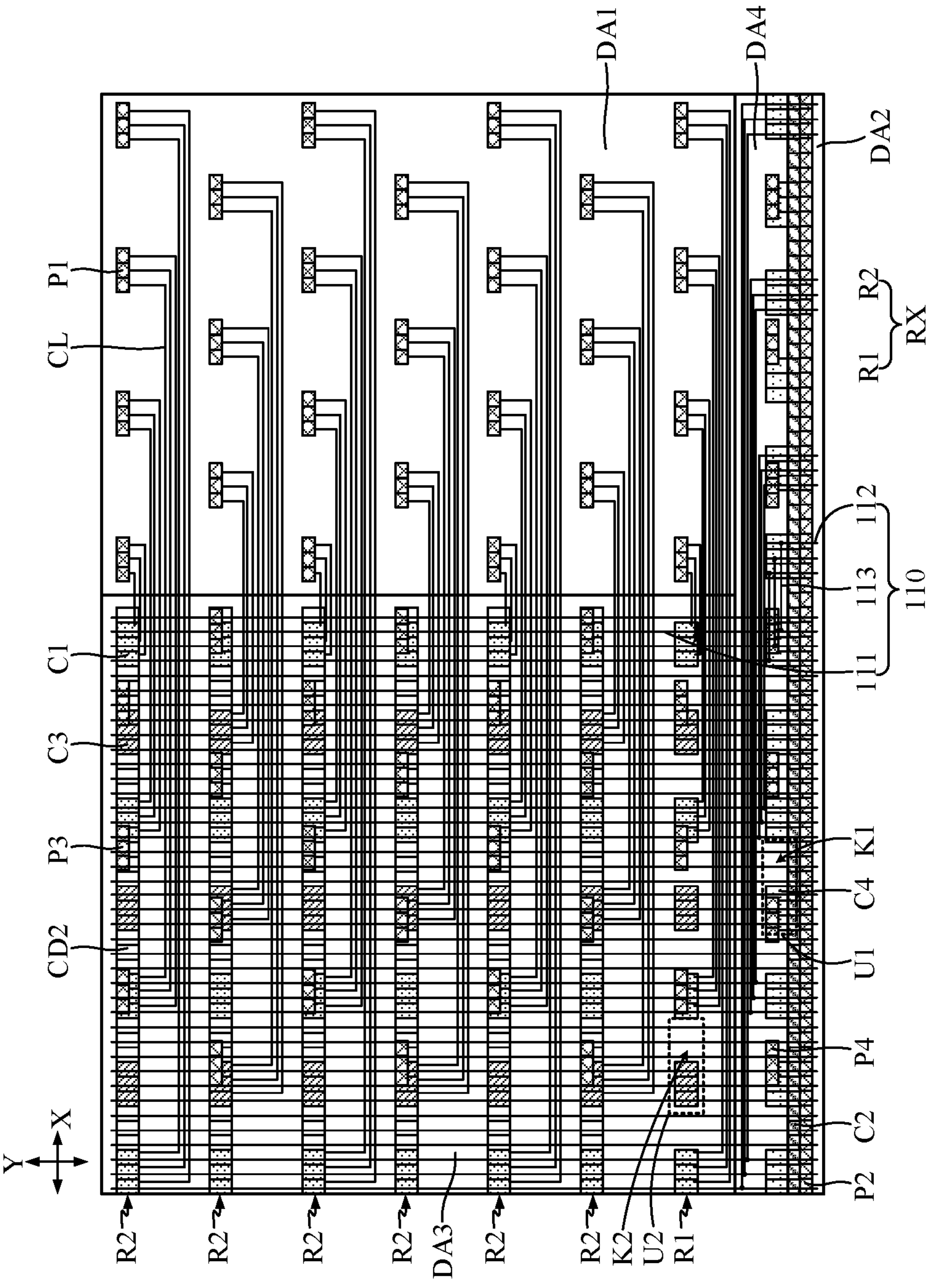
FIG. 6 is a partially enlarged schematic diagram of a display panel according to still another embodiment of the present disclosure.

FIG. 6 is a partial enlarged schematic diagram of a display panel according to still another embodiment of the present disclosure. Exemplarily, FIG. 6 is a partial enlarged schematic diagram of the region Q1 shown in FIG. 1. In some embodiments, multiple row units RX further include at least one second row unit R2 located at a side of the first row unit R1 away from the fourth display region DA4.

In each second row unit R2, multiple second preset pixel circuits are arranged adjacently in sequence along the first direction X, and include at least one of a first pixel circuit C1, a third pixel circuit C3, or a second virtual pixel circuit. For example, in some embodiments, the second preset pixel circuit in each second row unit R2 simultaneously includes a first pixel circuit C1, a third pixel circuit C3 and a second virtual pixel circuit CD2. In the above embodiments, the first row unit R1 can be obtained by selectively removing part of the pixel circuits on the original structure of the display panel, while the second row unit R2 does not need to be screened to remove the pixel circuits. When the display panel 100 still includes some second row units R2, the process of screening pixel circuits to be removed can be omitted, thereby improving the layout design efficiency.

In some embodiments, in each third display region DA3, the number of first row unit R1 is equal to the number of fourth display region DA4 adjacent to the third display region DA3, and each first row unit R1 is adjacent to a corresponding fourth display region DA4. For example, in the embodiments shown in FIG. 6, one side of the third display region DA3 along the second direction is provided with a fourth display region DA4, that is, for the third display region DA3, if the number of the fourth display region DA4 adjacent to the third display region DA3, the third display region DA3 includes one first row unit R1, and the first row unit R1 is disposed adjacent to the corresponding fourth display region DA4.

In some embodiments, fourth display regions DA4 are provided at both sides of the third display region DA3 along the second direction, that is, for the third display region DA3, If the number of fourth display regions DA4 adjacent to the third display region DA3 is two, the third display region DA3 includes two first row units R1, and each first row unit R1 is disposed corresponding to one adjacent fourth display region DA4.

Figure 7:
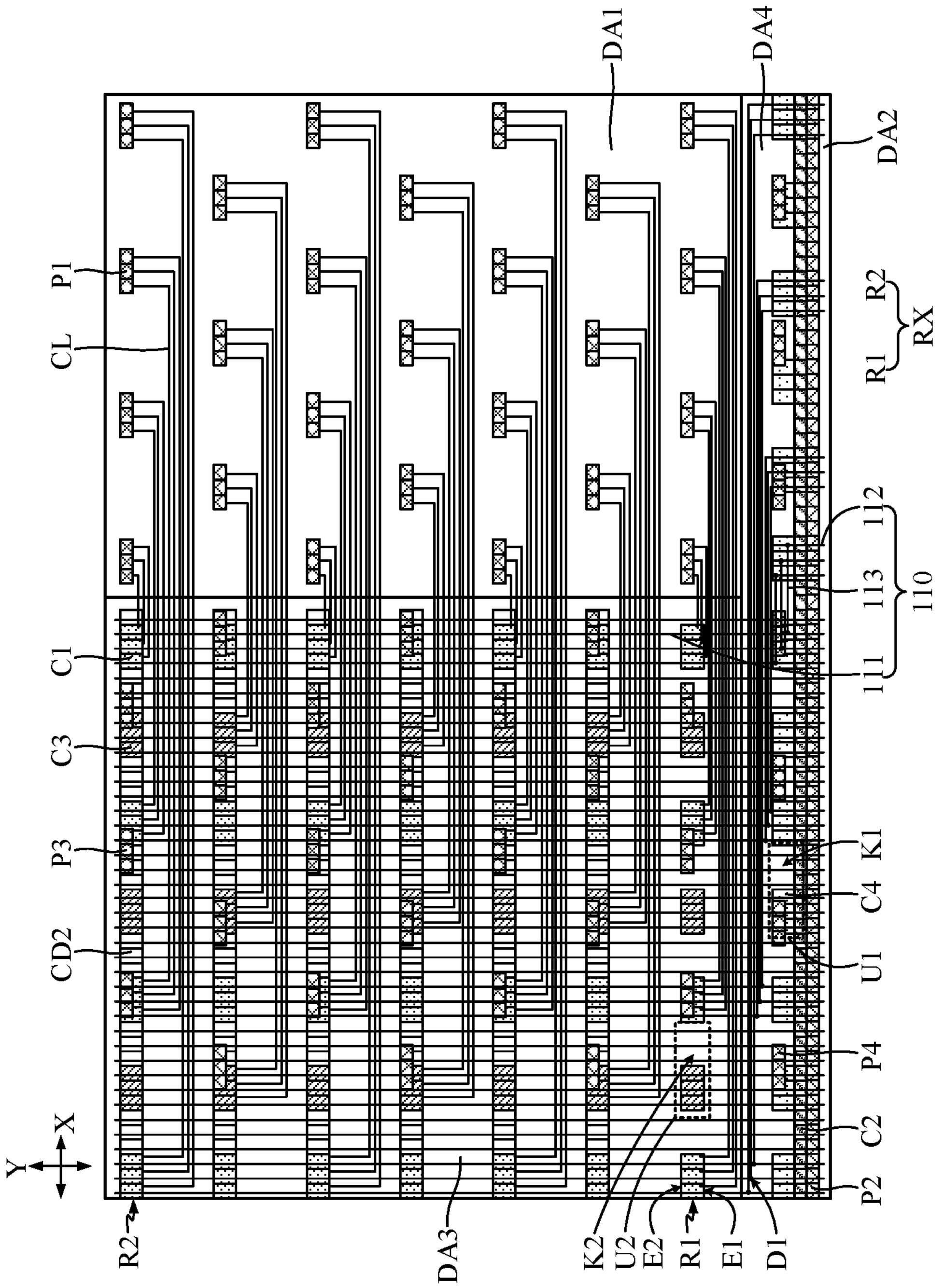
FIG. 7 is a partial enlarged schematic diagram of a display panel according to still another embodiment of the present disclosure.
Figure 8:
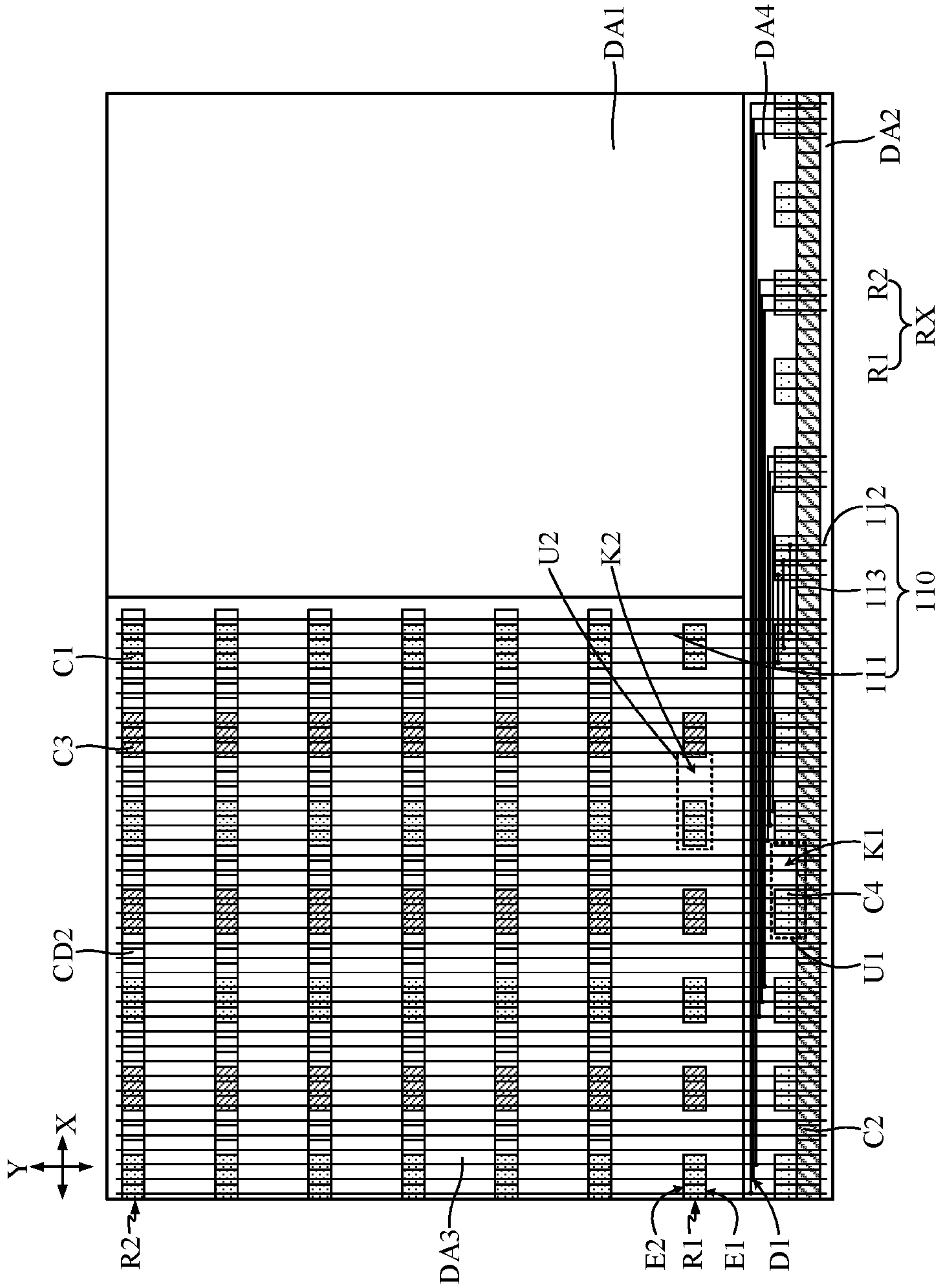
FIG. 8 is a structural schematic diagram after the light-emitting element shown in FIG. 7 is hidden according to an embodiment of the present disclosure.

FIG. 7 is a partial enlarged schematic diagram of a display panel according to still another embodiment of the present disclosure. Exemplarily, FIG. 7 is a partial enlarged schematic diagram of the region Q1 in FIG. 1. FIG. 8 is a structural schematic diagram after the light-emitting element shown in FIG. 7 is hidden according to an embodiment of the present disclosure. In some embodiments, each of the first data lines 110 includes a first data sub-line 111, a second data sub-line 112 and a third data sub-line 113. The first data sub-line 111 extends in the third display region DA3 along the second direction Y, and is electrically connected to multiple first pixel circuits C1. The second sub data lines 112 each extend in the second display region DA2 along the second direction Y, and are electrically connected to multiple second pixel circuits C2. The third data sub-line 113 passes through the fourth display region DA4, and electrically connects the first data sub-line 111 with the second data sub-line 112. At least one third data sub-line 113 passes through the first interval space K1. One first row unit R1 adjacent to the fourth display region DA4 includes a first side E1 and a second side E2 opposite to the first side E1. The first side E1 faces towards the fourth display region DA4.

In some embodiments, all third data sub-lines 113 electrically connected to all the second data sub-lines 112 in a same fourth display region DA4 are all located at the first side E1 of the first row unit R1 adjacent to the fourth display region DA4.

Figure 9:
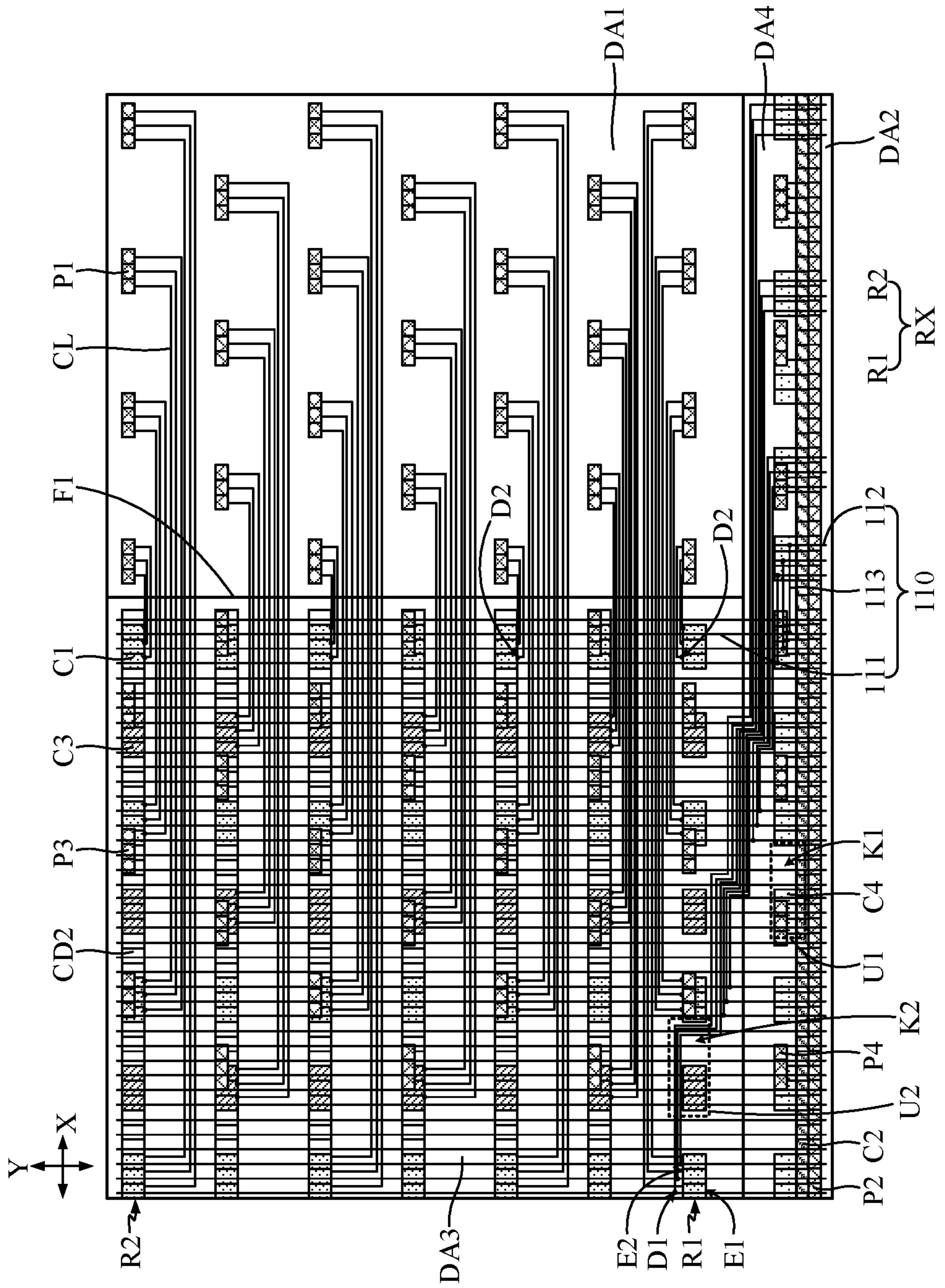
FIG. 9 is a partially enlarged schematic diagram of a display panel according to still another embodiment of the present disclosure.
Figure 10:
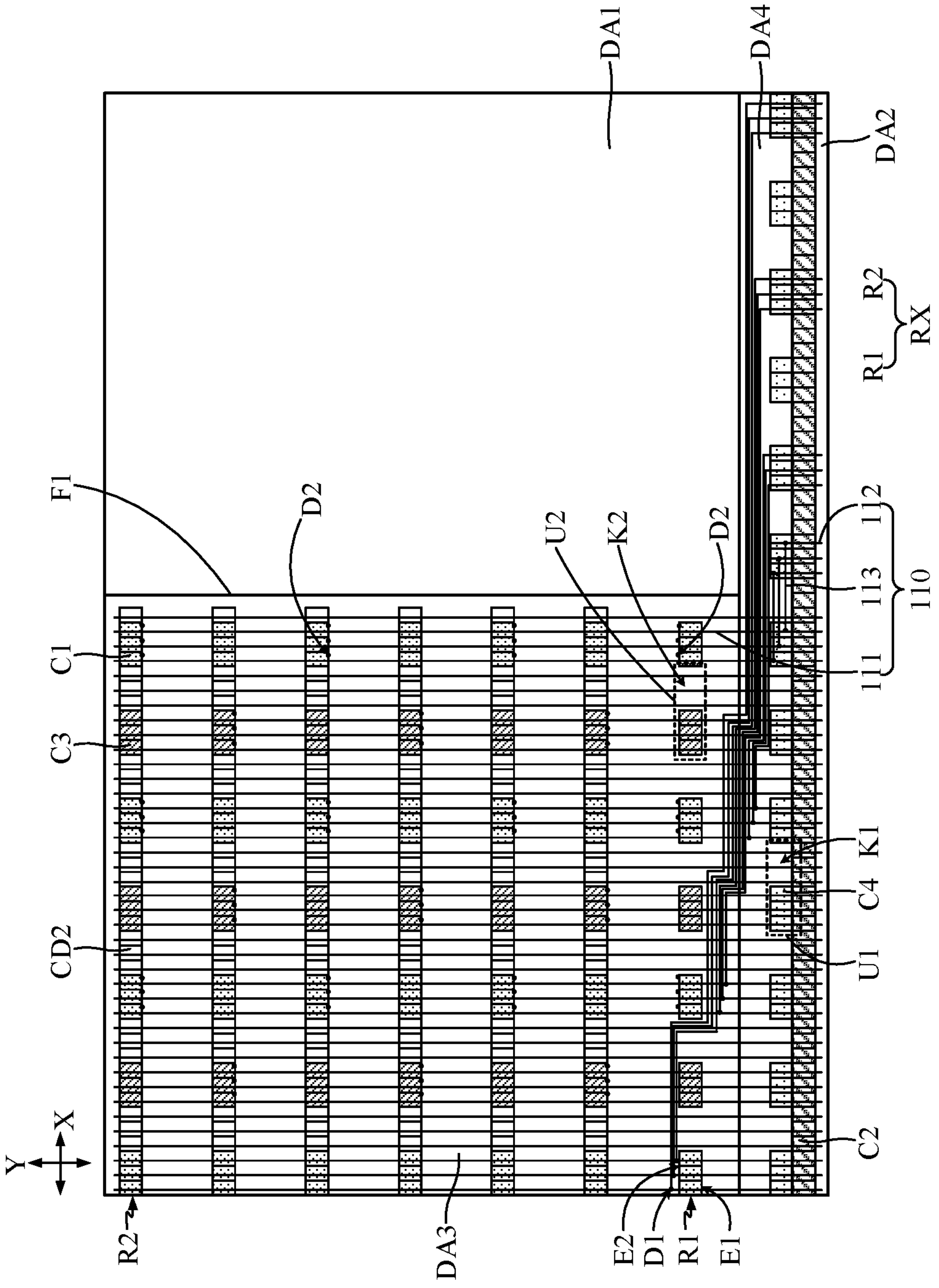
FIG. 10 is a schematic diagram of the structure after the light-emitting element in FIG. 9 is hidden.

FIG. 9 is a partial enlarged schematic diagram of a display panel according to another embodiment of the present disclosure. Exemplarily, FIG. 9 is a partial enlarged schematic diagram of the region Q1 in FIG. 1. FIG. 10 is a structural schematic diagram after the light-emitting element shown in FIG. 9 is hidden. In some embodiments, the third data sub-line 113 is electrically connected to the first data sub-line 111 through a first connection point D1. The first connection point D1 to which at least one third data sub-line 113 is connected is located at the second side E2. In this case, at least one third data sub-line 113 of the display panel 100 is connected to a side of the first row unit R1 away from the fourth display region DA4, and the first connection point D1 corresponding to the at least one third data sub-line 113 is close to the interior of the third display region DA3 and is away from the fourth display region DA4, which reduces the occupation area of the third data sub-lines 113 in the fourth display region DA4 to an extent, which is convenient to reduce the width of the fourth display region DA4 and improve the occupation area of the second display region DA2 as a normal display region.

In some embodiments, a first boundary line F1 is formed between each third display region DA3 and the first display region DA1. Between each third display region DA3 and the first display region DA1, multiple first pixel circuits C1 corresponding to multiple first light-emitting elements P1 arranged in sequence along a direction away from the first boundary line F1 are sequentially arranged in the third display region DA3 in a direction away from the first boundary line F1.

As shown in FIG. 9, in some embodiments, at least one third data sub-line 113 corresponding to the first data sub-line 111 farthest from the first display region DA1 extends to the second side E2. At least one third data sub-line 113 extends in a stepped shape. The third data sub-line 113 extending in a stepped shape can prevent its orthographic projection on the display surface from overlapping with the orthographic projection of the connection line CL on the display surface, so as to prevent the connection line CL from affecting a load of the third data sub-line 113, thereby reducing the effect of the connection line CL on the load of the first data line 110.

In the embodiments shown in FIG. 9, taking multiple row units RX that include multiple second row units R2 and at least one first row unit R1 adjacent to the fourth display region DA4 as an example, in other embodiments, multiple row units RX can be arranged in other manners, for example, multiple row units RX include multiple first row units R1 but do not include a second row unit R2.

As shown in FIG. 9, in some embodiments, the connection line CL is electrically connected to the first pixel circuit C1 through a second connection point D2. In the first row unit R1, at least one second connection point D2 is located at the second side E2. For example, in some embodiments, each second connection point D2 in the first row unit R1 adjacent to the fourth display region DA4 is located at the second side E2. In some other embodiments, in the first row unit R1 adjacent to the fourth display region DA4, at least one second connection points D2 can be located at the second side E2, and another at least one second connection point D2 can be located at the first side E1. When at least one second connection point D2 is located at the second side E2, the connection line CL is connected to the pixel circuit from the second side E2, and the connection line CL can be arranged at the second side E2, so that the space occupied by the connection line CL at the first side E1 is reduced, thereby facilitating the arrangement of part of the third data sub-lines 113 at the first side E1.

In some embodiments, for each third display region DA3, the number of fourth display regions DA4 adjacent to the third display region DA3 is one. In the third display region DA3, the second connection points D2 in the first row unit R1 adjacent to the fourth display region DA4 are all located at the second side E2, so that multiple connection lines CL connected to the first row unit R1 are all located at a side of the first row unit R1 away from the fourth display region DA4. In some embodiments, in the third display region DA3, multiple connection lines CL connected to each of the remaining row units RX are all located at a side of the row unit RX facing the fourth display region DA4. In some other embodiments, in the third display region DA3, among the remaining row units RX, multiple connection lines CL connected to at least some of the row units RX are located at a side of the row unit RX away from the fourth display region DA4. In one embodiment, multiple connection lines CL connected to each row unit RX in the third display region DA3 are located at a side of the row unit RX away from the fourth display region DA4, so that the connection lines CL corresponding to the two row units RX are not arranged between adjacent row units RX, and the spacing between the row units RX is more balanced.

In some embodiments, at least one first pixel circuit C1 in the first row unit R1 is mirrored with at least one first pixel circuit C1 in the remaining row unit RX about a predetermined symmetry axis, and the predetermined symmetry axis is parallel to the first direction X. For example, in some embodiments, multiple row units RX include the first row unit R1 and the second row unit R2, the first pixel circuit C1 in the first row unit R1 is mirrored with the first pixel circuit C1 in the second row unit R2 about a predetermined symmetry axis, and the predetermined symmetry axis is parallel to the first direction X. For example, in the first pixel circuit C1 of the second row unit R2, the second connection point D2 is located at a lower side of the first pixel circuit C1 along the second direction Y, and in the first pixel circuit C1 of the first row unit R1, the second connection point D2 is located at an upper side of the first pixel circuit C1 along the second direction Y. Compared with the first pixel circuits C1 in the remaining row units RX, the at least one first pixel circuit C1 in the first row unit R1 is equivalent to being inverted along the second direction X, which is convenient to set the corresponding second connection point D2 at a side away from the fourth display region DA4, and the possibility of crossing between the connection line CL and the first data line 110 is reduced.

Figure 11:
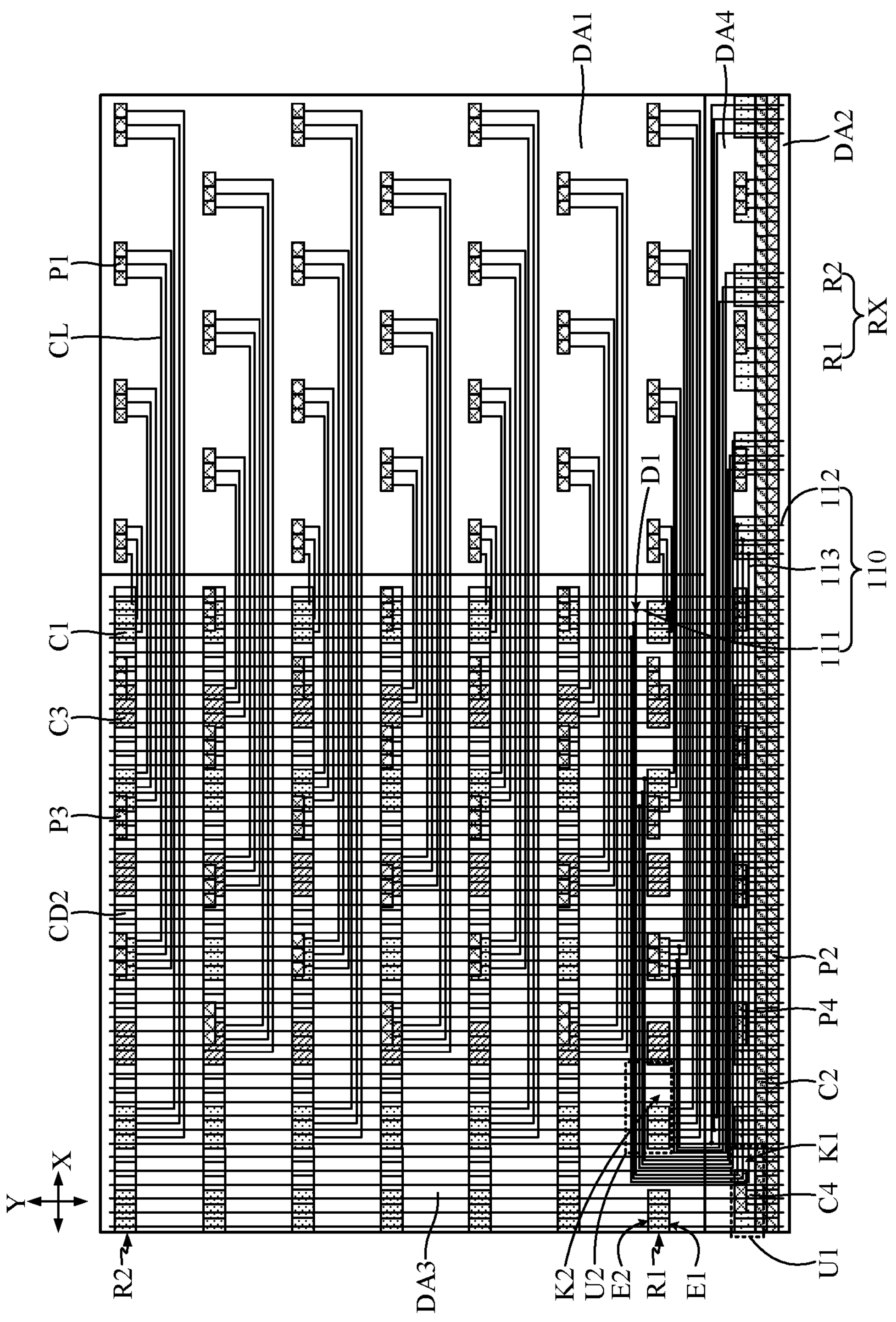
FIG. 11 is a partial enlarged schematic diagram of a display panel according to still another embodiment of the present disclosure.
Figure 12:
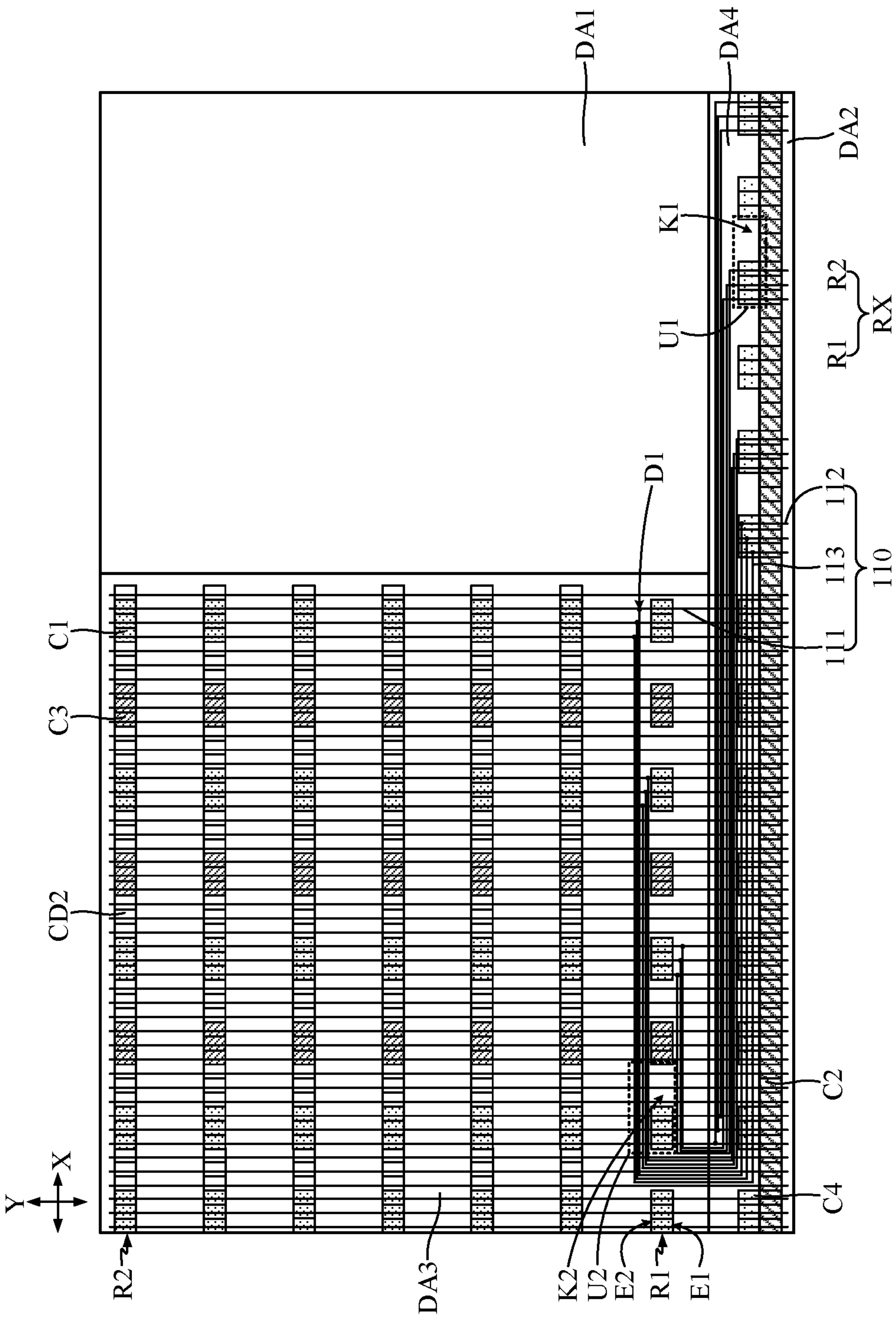
FIG. 12 is a structural schematic diagram after the light-emitting element shown in FIG. 11 is hidden according to an embodiment of the present disclosure.

FIG. 11 is a partial enlarged schematic diagram of a display panel according to another embodiment of the present disclosure. Exemplarily, FIG. 11 is a partial enlarged schematic diagram of the region Q1 in FIG. 1. FIG. 12 is a structural schematic diagram after the light-emitting element shown in FIG. 11 is hidden according to an embodiment of the present disclosure. In some embodiments, at least one third data sub-line 113 corresponding to at least one first data sub-line 111 closest to the first display region DA1 extends to the second side E2 and passes through the second interval space K2 located at a side of the corresponding first data sub-line 111 away from the first display region DA1. In the above embodiments, at least part of the third data sub-lines 113 bypasses the second interval space K2 at a side away from the first display region DA1, so that the length difference between the third data sub-lines 113 of multiple first data lines 110 can be reduced, and corresponding load compensation is performed on multiple first data lines 110 respectively, thereby improving the load consistency of multiple first data lines 110, and improving the uniformity of display brightness.

In the embodiments shown in FIG. 11 and FIG. 12, taking multiple row units RX that include multiple second row units R2 and at least one first row unit R1 adjacent to the fourth display region DA4 as an example, in other embodiments, multiple row units RX can be arranged in other manners, for example, multiple row units RX include multiple first row units R1 but do not include a second row unit R2.

One embodiment of the present disclosure further provides a display apparatus including a display panel 100 according to any one of the above-mentioned embodiments of the present disclosure. The display panel 100 includes a first display region DA1, a second display region DA2, a third display region DA3, and a fourth display region DA4. The third display region DA3 is located at least one side of the first display region DA1 along a first direction X. The second display region DA2 at least partially surrounds the first display region DA1 and the third display region DA3. The first display region DA1 is reused into a photosensitive element integration region. The fourth display region DA4 is located between the third display region DA3 and the second display region DA2, and between the first display region DA1 and the second display region DA2, along a second direction Y, and the second direction Y intersects the first direction X.

The display panel 100 further includes a first pixel circuit C1 and a first light-emitting element P1 that are electrically connected to each other, a second pixel circuit C2 and a second light-emitting element P2 that are electrically connected to each other, a third pixel circuit C3 and a third light-emitting element P3 that are electrically connected to each other, a fourth pixel circuit C4 and a fourth light emitting element P4 that are electrically connected to each other.

The first light-emitting element P1 is located in the first display region DA1, and the first pixel circuit C1 is located in the third display region DA3. Each first pixel circuit C1 is electrically connected to at least one first light-emitting element P1 through corresponding connection lines CL. The second pixel circuit C2 and the second light emitting element P2 that are electrically connected to each other are located in the second display region DA2. The third pixel circuit C3 and the third light emitting element P3 that are electrically connected to each other are located in the third display region DA3. The fourth pixel circuit C4 and the fourth light-emitting element P4 that are electrically connected to each other are located in the fourth display region DA4.

The fourth pixel circuits C4 are arranged in at least one row in the fourth display region DA4. Each row of the fourth pixel circuits C4 includes at least one first arrangement unit U1 arranged along the first direction X. Each first arrangement unit U1 includes N fourth pixel circuits C4 and a first interval space K1, where N is a positive integer. The N fourth pixel circuits C4 are sequentially arranged adjacent to each other along the first direction X, and the first interval space K1 is located at a side of the N fourth pixel circuits C4 along the first direction X.

The display panel 100 further includes multiple first data lines 110. Each first data lines 110 is electrically connected to at least one first pixel circuit C1 and at least one second pixel circuit C2. At least one first data line 110 passes through the first interval space K1, so that the orthographic projections of multiple first data lines 110 on the display surface do not overlap with the orthographic projections of the connecting lines CL on the display surface.

With the display apparatus according to the embodiments of the present disclosure, in the display panel 100, the fourth pixel circuits C4 are arranged in at least one row in the fourth display region DA4, and each row of the fourth pixel circuits C4 includes first arrangement units U1. Each first arrangement unit U1 includes the first interval space K1, that is, at least one pixel circuit in the fourth display region DA4 that is not connected to the light-emitting element is removed to obtain the first interval space K1. The first interval space K1 can be used as a wiring space for the first data lines 110, and at least one first data line 110 passes through the first interval space K1, thereby reducing or even preventing the first data lines 110 from passing through the first display region DA1. The orthographic projection of a data line 110 on the display surface does not overlap with the orthographic projection of the connection line CL on the display surface, so as to avoid that the connection line CL affects the first data line 110. In this case, a load difference between the part of the first data line 110 in the third display region DA3 and the part of the first data line 110 in the second display region DA2 is reduced, so that the brightness of the first light-emitting element P1 tends to be the same as that of the second light-emitting element P2, thereby improving the uniformity of the display brightness of the display panel 100 and the display apparatus.

In accordance with the embodiments of the present disclosure as described above, these embodiments do not exhaustively describe all the details and do not limit only the embodiments described. Many modifications and variations can be made in light of the above description. These embodiments are selected and described in this specification to better explain the principle and practical application of the present disclosure, so that those skilled in the art can make good use of the present disclosure and modifications based on the present disclosure. The present disclosure is to be limited only by the claims, their full scope and equivalents.

What is claimed is:

1. A display panel, having a first display region, a second display region, a third display region, and at least one fourth display region, wherein the third display region is located at at least one side of the first display region in a first direction, the second display region at least partially surrounds the first display region and the third display region, the first display region is reused as a photosensitive element integration region, and the at least one fourth display region is located between the third display region and the second display region in a second direction intersecting with the first direction and is located between the first display region and the second display region in the second direction; and wherein the display panel comprises:

first pixel circuits and first light-emitting elements, wherein the first pixel circuits are electrically connected to the first light-emitting elements, the first light-emitting elements are located in the first display region, and the first pixel circuits are located in the third display region;

second pixel circuits and second light-emitting elements, wherein the second pixel circuits are electrically connected to the second light-emitting elements, and the second pixel circuits and the second light-emitting elements are located in the second display region;

third pixel circuits and third light-emitting elements, wherein the third pixel circuits are electrically connected to the third light-emitting elements, and the third pixel circuits and the third light-emitting elements are located in the third display region;

fourth pixel circuits and fourth light-emitting elements, wherein the fourth pixel circuits are electrically connected to the fourth light-emitting elements; the fourth pixel circuits and the fourth light-emitting elements are located in the at least one fourth display region; the fourth pixel circuits are arranged in at least one row in the at least one fourth display region, wherein each of the at least one row of the fourth pixel circuits comprises at least one first arrangement unit arranged along the first direction, wherein each of the at least one first arrangement unit comprises N fourth pixel circuits of the fourth pixel circuits and a first interval space, N is a positive integer, wherein the N fourth pixel circuits are sequentially arranged adjacent to each other along the first direction, and the first interval space is located at a side of the N fourth pixel circuits along the first direction; and first data lines, wherein each of the first data lines is electrically connected to at least one of the first pixel circuits and at least one of the second pixel circuits, and at least one of the first data lines passes through the first interval space, wherein each of the first pixel circuits is electrically connected to at least one of the first light-emitting elements through a corresponding one of connecting lines, and each of the first data lines comprises a first data sub-line, a second data sub-line and a third data sub-line, wherein the first data sub-line extends along the second direction in the third display region and is electrically connected to at least one of the first pixel circuits, the second data sub-line extends along the second direction in the second display region and is electrically connected to at least two of the second pixel circuits, and the third data sub-line passes through one of the at least one fourth display region and electrically connects the first data sub-line with the second data sub-line; wherein at least one third data sub-line of the third data sub-lines of the first data lines passes through one of the at least one first interval space of the at least one first arrangement unit in such a manner that an orthographic projection of the at least one third data sub-line on a display surface does not overlap with an orthographic projection of one of the connecting lines on the display surface.

2. The display panel according to claim 1, comprising first pixel units located in one of the at least one fourth display region, wherein each of the first pixel units comprises M fourth light-emitting elements of the fourth light-emitting elements, where N is a positive integer times of M.

3. The display panel according to claim 1, wherein row units are provided in the third display region, wherein in each of the row units, at least two of the first pixel circuits and/or at least two of the third pixel circuits and/or at least two virtual pixel circuits are sequentially arranged along the first direction according to a preset rule; and the row units are arranged along the second direction, the row units comprise at least one first row unit adjacent to one of the at least one fourth display region, and each of the at least one first row unit comprises second arrangement units arranged along the first direction, wherein each of the second arrangement units comprise P first preset pixel circuits and a second interval space, where P is a positive integer; one of the P first preset pixel circuits comprises at least one of one of the first pixel circuits, one of the third pixel circuits, or a first virtual pixel circuit; the P first preset pixel circuits are sequentially arranged adjacent to each other along the first direction, and the second interval space is located at a side of the P first predetermined pixel circuits along the first direction.

4. The display panel according to claim 3, wherein at least one of the second interval spaces of the second arrangement units communicates with the first interval space along the second direction.

5. The display panel according to claim 3, wherein a length of the second interval space along the first direction is 0.5 times to 3 times a length of one of the first pixel circuits along the first direction.

6. The display panel according to claim 3, wherein the row units further comprises at least one second row unit located at a side of one of the at least one first row unit away from the at least one fourth display region, and in each of the at least one second row unit, second preset pixel circuits are sequentially arranged adjacent to each other along the first direction, and the second preset pixel circuits comprises at least one of one of the first pixel circuits, one of the third pixel circuits, or a second virtual pixel circuit.

7. The display panel according to claim 3, wherein, in the third display region, a number of the at least one first row unit is equal to a number of the at least one fourth display region adjacent to the third display region, and each of the at least one first row unit is adjacent to a corresponding one of the at least one fourth display region.

8. The display panel according to claim 3, wherein one of the at least one first row unit adjacent to one of the at least one fourth display region has a first side and a second side that are opposite to each other, wherein the first side faces towards one of the at least one fourth display region.

9. The display panel according to claim 8, wherein at least two of the third data sub-lines that are electrically connected to at least two of the second data sub-lines of the first data lines in one of the at least one fourth display region are located at the first side adjacent to the fourth display region.

10. The display panel according to claim 8, wherein the third data sub-line is electrically connected to the first data sub-line through one of first connection points, and one of the first connection points that is connected to at least one of the third data sub-lines is located at the second side.

11. The display panel according to claim 10, wherein a first boundary line is formed between the third display region and the first display region; between each third display region and the first display region, at least two of the first pixel circuits corresponding to at least two first light-emitting elements arranged in sequence along a direction away from the first boundary line are sequentially arranged in the third display region in a direction away from the first boundary line.

12. The display panel according to claim 11, wherein at least one of the third data sub-lines corresponding to the first data sub-line farthest from the first display region extends to the second side, and at least one of the third data sub-lines extends in a stepped shape.

13. The display panel according to claim 11, wherein at least one of the third data sub-lines of the first data lines that corresponds to at least one of the first data sub-lines of the first data lines closest to the first display region extends to the second side and passes through the second interval space located at a side of a corresponding one of the first data sub-lines away from the first display region.

14. The display panel according to claim 8, wherein one of the connection lines is electrically connected to one of the first pixel circuits through one of second connection points, and in the first row unit, at least one of the second connection points is located at the second side.

15. The display panel according to claim 14, wherein the at least one first row unit comprises a plurality of first row units, at least one of the first pixel circuits that is in one of the plurality of first row units is mirrored with at least another one of the first pixel circuits that is located in one of remaining row units of the plurality of first row units about a predetermined symmetry axis, and the predetermined symmetry axis is parallel to the first direction.

16. A display apparatus, comprising a display panel, wherein the display panel has a first display region, a second display region, a third display region, and at least one fourth display region, wherein the third display region is located at at least one side of the first display region in a first direction, the second display region at least partially surrounds the first display region and the third display region, the first display region is reused as a photosensitive element integration region, and the at least one fourth display region is located between the third display region and the second display region in a second direction intersecting with the first direction and is located between the first display region and the second display region in the second direction; and wherein the display panel comprises:

first pixel circuits and first light-emitting elements, wherein the first pixel circuits are electrically connected to the first light-emitting elements, the first light-emitting elements are located in the first display region, and the first pixel circuits are located in the third display region;

second pixel circuits and second light-emitting elements, wherein the second pixel circuits are electrically connected to the second light-emitting elements, and the second pixel circuits and the second light-emitting elements are located in the second display region;

third pixel circuits and third light-emitting elements, wherein the third pixel circuits are electrically connected to the third light-emitting elements, and the third pixel circuits and the third light-emitting elements are located in the third display region;

fourth pixel circuits and fourth light-emitting elements, wherein the fourth pixel circuits are electrically connected to the fourth light-emitting elements; the fourth pixel circuits and the fourth light-emitting elements are located in the at least one fourth display region; the fourth pixel circuits are arranged in at least one row in the at least one fourth display region, wherein each of the at least one row of the fourth pixel circuits comprises at least one first arrangement unit arranged along the first direction, wherein each of the at least one first arrangement unit comprises N fourth pixel circuits of the fourth pixel circuits and a first interval space, N is a positive integer, wherein the N fourth pixel circuits are sequentially arranged adjacent to each other along the first direction, and the first interval space is located at a side of the N fourth pixel circuits along the first direction; and first data lines, wherein each of the first data lines is electrically connected to at least one of the first pixel circuits and at least one of the second pixel circuits, and at least one of the first data lines passes through the first interval space, wherein each of the first pixel circuits is electrically connected to at least one of the first light-emitting elements through a corresponding one of connecting lines, and each of the first data lines comprises a first data sub-line, a second data sub-line and a third data sub-line, wherein the first data sub-line extends along the second direction in the third display region and is electrically connected to at least one of the first pixel circuits, the second data sub-line extends along the second direction in the second display region and is electrically connected to at least two of the second pixel circuits, and the third data sub-line passes through one of the at least one fourth display region and electrically connects the first data sub-line with the second data sub-line; wherein at least one third data sub-line of the third data sub-lines of the first data lines passes through one of the at least one first interval space of the at least one first arrangement unit in such a manner that an orthographic projection of the at least one third data sub-line on a display surface does not overlap with an orthographic projection of one of the connecting lines on the display surface.

17. The display apparatus according to claim 16, wherein each of the first pixel circuits is electrically connected to at least one of the first light-emitting elements through a corresponding one of connecting lines, each of the first data lines comprises a first data sub-line, a second data sub-line and a third data sub-line, wherein the first data sub-line extends along the second direction in the third display region and is electrically connected to at least one of the first pixel circuits, the second data sub-line extends along the second direction in the second display region and is electrically connected to at least two of the second pixel circuits, and the third data sub-line passes through one of the at least one fourth display region and electrically connects the first data sub-line with the second data sub-line; wherein at least one third data sub-line of the third data sub-lines of the first data lines passes through one of the at least one first interval space of the at least one first arrangement unit in such a manner that an orthographic projection of the at least one third data sub-line on a display surface does not overlap with an orthographic projection of one of the connecting lines on the display surface;

row units are provided in the third display region, wherein in each of the row units, at least two of the first pixel circuits and/or at least two of the third pixel circuits and/or at least two virtual pixel circuits are sequentially arranged along the first direction according to a preset rule; and the row units are arranged along the second direction, the row units comprise at least one first row unit adjacent to one of the at least one fourth display region, and each of the at least one first row unit comprises second arrangement units arranged along the first direction, wherein each of the second arrangement units comprise P first preset pixel circuits and a second interval space, where P is a positive integer; one of the P first preset pixel circuits comprises at least one of one of the first pixel circuits, one of the third pixel circuits, or a first virtual pixel circuit; the P first preset pixel circuits are sequentially arranged adjacent to each other along the first direction, and the second interval space is located at a side of the P first predetermined pixel circuits along the first direction.

18. The display apparatus according to claim 17, wherein one of the at least one first row unit adjacent to one of the at least one fourth display region has a first side and a second side that are opposite to each other, wherein the first side faces towards one of the at least one fourth display region; and the third data sub-line is electrically connected to the first data sub-line through one of first connection points, and one of the first connection points that is connected to at least one of the third data sub-lines is located at the second side.

19. A display panel, having a first display region, a second display region, a third display region, and at least one fourth display region, wherein the third display region is located at at least one side of the first display region in a first direction, the second display region at least partially surrounds the first display region and the third display region, the first display region is reused as a photosensitive element integration region, and the at least one fourth display region is located between the third display region and the second display region in a second direction intersecting with the first direction and is located between the first display region and the second display region in the second direction; and wherein the display panel comprises:

first pixel circuits and first light-emitting elements, wherein the first pixel circuits are electrically connected to the first light-emitting elements, the first light-emitting elements are located in the first display region, and the first pixel circuits are located in the third display region;

second pixel circuits and second light-emitting elements, wherein the second pixel circuits are electrically connected to the second light-emitting elements, and the second pixel circuits and the second light-emitting elements are located in the second display region;

third pixel circuits and third light-emitting elements, wherein the third pixel circuits are electrically connected to the third light-emitting elements, and the third pixel circuits and the third light-emitting elements are located in the third display region;

fourth pixel circuits and fourth light-emitting elements, wherein the fourth pixel circuits are electrically connected to the fourth light-emitting elements; the fourth pixel circuits and the fourth light-emitting elements are located in the at least one fourth display region; the fourth pixel circuits are arranged in at least one row in the at least one fourth display region, wherein each of the at least one row of the fourth pixel circuits comprises at least one first arrangement unit arranged along the first direction, wherein each of the at least one first arrangement unit comprises N fourth pixel circuits of the fourth pixel circuits and a first interval space, N is a positive integer, wherein the N fourth pixel circuits are sequentially arranged adjacent to each other along the first direction, and the first interval space is located at a side of the N fourth pixel circuits along the first direction; and first data lines, wherein each of the first data lines is electrically connected to at least one of the first pixel circuits and at least one of the second pixel circuits, and at least one of the first data lines passes through the first interval space, wherein a length of the first interval space along the first direction is 0.5 times to 3 times a length of one of the fourth pixel circuits along the first direction.

20. A display panel, having a first display region, a second display region, a third display region, and at least one fourth display region, wherein the third display region is located at at least one side of the first display region in a first direction, the second display region at least partially surrounds the first display region and the third display region, the first display region is reused as a photosensitive element integration region, and the at least one fourth display region is located between the third display region and the second display region in a second direction intersecting with the first direction and is located between the first display region and the second display region in the second direction; and wherein the display panel comprises:

first pixel circuits and first light-emitting elements, wherein the first pixel circuits are electrically connected to the first light-emitting elements, the first light-emitting elements are located in the first display region, and the first pixel circuits are located in the third display region;

second pixel circuits and second light-emitting elements, wherein the second pixel circuits are electrically connected to the second light-emitting elements, and the second pixel circuits and the second light-emitting elements are located in the second display region;

third pixel circuits and third light-emitting elements, wherein the third pixel circuits are electrically connected to the third light-emitting elements, and the third pixel circuits and the third light-emitting elements are located in the third display region;

fourth pixel circuits and fourth light-emitting elements, wherein the fourth pixel circuits are electrically connected to the fourth light-emitting elements; the fourth pixel circuits and the fourth light-emitting elements are located in the at least one fourth display region; the fourth pixel circuits are arranged in at least one row in the at least one fourth display region, wherein each of the at least one row of the fourth pixel circuits comprises at least one first arrangement unit arranged along the first direction, wherein each of the at least one first arrangement unit comprises N fourth pixel circuits of the fourth pixel circuits and a first interval space, N is a positive integer, wherein the N fourth pixel circuits are sequentially arranged adjacent to each other along the first direction, and the first interval space is located at a side of the N fourth pixel circuits along the first direction; and wherein the first interval space is obtained by removing at least one pixel circuit in the fourth display region that does not need to be connected to the light-emitting element; and first data lines, wherein each of the first data lines is electrically connected to at least one of the first pixel circuits and at least one of the second pixel circuits, and at least one of the first data lines passes through the first interval space.

* * * * *